US007630932B2

(12) United States Patent
Danaher et al.

(10) Patent No.: US 7,630,932 B2
(45) Date of Patent: Dec. 8, 2009

(54) LOAN RATE AND LENDING INFORMATION ANALYSIS SYSTEM

(75) Inventors: John Thomas Danaher, San Luis Obispo, CA (US); Michael Maxwell, San Luis Obispo, CA (US); Justin Depow, San Luis Obispo, CA (US); Scott Metzger, San Luis Obispo, CA (US)

(73) Assignee: Transunion Interactive, Inc., Chicago, IL (US)

( * ) Notice: Subject to any disclaimer, the term of this patent is extended or adjusted under 35 U.S.C. 154(b) by 1379 days.

(21) Appl. No.: 10/355,755

(22) Filed: Jan. 31, 2003

(65) Prior Publication Data

US 2003/0149659 A1 Aug. 7, 2003

Related U.S. Application Data

(60) Provisional application No. 60/353,919, filed on Jan. 31, 2002, provisional application No. 60/404,597, filed on Aug. 19, 2002.

(51) Int. Cl.
*G06Q 40/00* (2006.01)
(52) U.S. Cl. .......................................... 705/38; 705/37
(58) Field of Classification Search ............... 705/10–44
See application file for complete search history.

(56) References Cited

U.S. PATENT DOCUMENTS 6,823,319 B1 * 11/2004 Lynch et al. .................. 705/38

6,988,082 B1 * 1/2006 Williams et al. ........... 705/36 T

OTHER PUBLICATIONS

"LandSafe Offers Online Order, Delivery of Credit Reporting Products; Company's Web Site Enables Convenient and Easy Lending Decisions", PR Newswire, New York, Oct. 27, 200, p. 1.*
"Consumers now Can Know What Loan Rate Offers to Expect based on their FICO Credit Score at My FICO.com", Business Editors and Real Estate/Automotive Writers. Business Wire, New York: Mar. 6, 2002, p. 1.*
"Countrywide Reports February Operations Data", PR NewsWire, New York: Mar. 6, 2000, p. 1.*

* cited by examiner

*Primary Examiner*—Frantzy Poinvil
(74) *Attorney, Agent, or Firm*—William J. Lenz; Neal, Gerber & Eisenberg LLP

(57) ABSTRACT

Methods, apparatuses and systems facilitating analysis of expected interest rates and, in some embodiments, other conditions and circumstances associated with a variety of different loan types. In one embodiment, the present invention allows for a network-based application allowing users the ability to assess for what loan interest rates they are eligible based on current interest rate data and credit analysis scores that are used to determine qualifications for one of a variety of interest rates. In one embodiment, the present invention enables a web-based loan rate analysis system that combines credit score analysis with analyses of collateral and debt/income to offer users the ability to learn for what loan interest rates they are eligible when purchasing or refinancing a home. Embodiments of the present invention further provide "what if" calculators allowing users to assess the impact of hypothetical changes to various factors determinative of available loan rates and other circumstances associated with loans.

22 Claims, 8 Drawing Sheets

LOAN RATE AND LENDING INFORMATION ANALYSIS SYSTEM

CROSS REFERENCE TO RELATED APPLICATIONS

The present application claims priority from U.S. Provisional Application Ser. No. 60/353,919 filed Jan. 31, 2002 and entitled "Methods and Systems Facilitating Assessment of Borrowing Power", and U.S. Provisional Application Ser. No. 60/404,597 filed Aug. 19, 2002 and entitled "Loan Rate and Lending Information Analysis System."

FIELD OF THE INVENTION

The present invention relates to credit reporting and lending systems and, more particularly, to methods, apparatuses and systems facilitating analysis tasks associated with lending, such as expected loan rates, borrowing power in connection with a home purchase or refinancing, and other factors, circumstances or conditions associated with loans, such as mortgages, car loans, lines of credit, etc.

BACKGROUND OF THE INVENTION

The Internet is a global network of millions of computers belonging to various commercial and non-profit entities such as corporations, universities, and research organizations. The computer networks of the Internet are connected by gateways that handle data transfer and conversion of messages from a sending network to the protocols used by a receiving network. The Internet's collection of networks and gateways generally use the TCP/IP protocol for message transfer. TCP/IP is an acronym for Transmission Control Protocol/Internet Protocol, a software protocol suite initially developed by the Department of Defense.

Typically, the computers connected to a wide area network such as the Internet are identified as either servers or clients. A server is a computer that stores files that are available to other computers connected to the network. A client is a computer connected to the network that accesses the files and other resources provided by a server. To obtain information from a server, a client computer makes a request for a file or information located on the server using a specified protocol, such as HTTP. Upon receipt of a properly formatted request, the server transmits the file to the client computer.

The increasing use of wide area networks, such as the Internet, has resulted in an explosion in the provision of on-line services. Computer users can access a vast wealth of information and services by utilizing a wide area network to establish a connection with other computers connected to the network. Indeed, the Internet has quickly become a means for not only obtaining information, but for conducting commercial transactions and retail purchases. For example, the Internet has become a popular resource for consumers to evaluate different loan products and assess the potential conditions under which a loan (e.g., home mortgage, car loan, etc.) may be obtained. To assist users, many online systems feature a variety of loan calculators. Such loan calculators assist the user in determining a number of different factors, the most popular of which being a monthly payment given the inputs of loan amount, interest and term. Other loan calculators assist the user in evaluating the potential cost savings associated with home refinancing.

Although these and many other online loan calculators exist, they often require the consumer to estimate or provide important pieces of information that factor into the expected terms of a loan, the most of important of which being the expected interest rate. In connection with mortgage or refinancing calculators, the user must also estimate the current value of the subject property and an affordable loan amount. As many consumers have experienced, their initial estimates concerning these inputs are often incorrect, decreasing the ultimate utility of such calculators in assisting an assessment of the likely circumstances associated with a contemplated loan.

In light of the foregoing, a need in the art exists for methods, apparatuses and systems that remove the uncertainties associated with such prior art calculators and obtain more accurate inputs to provide an enhanced, industry-data driven approximation of the borrowing terms a particular consumer could expect in connection with different loan types, such as home loans of varying term, car loans, etc. Embodiments of the present invention substantially fulfill this need.

SUMMARY OF THE INVENTION

The present invention provides methods, apparatuses and systems facilitating analysis of expected interest rates and, in some embodiments, other conditions and circumstances associated with a variety of different loan types. In one embodiment, the present invention allows for a network-based application allowing users the ability to assess for what loan interest rates they are eligible based on current interest rate data and credit analysis scores that are used to determine qualifications for one of a variety of interest rates. In one embodiment, the present invention enables a web-based loan rate analysis system that combines credit score analysis with analyses of collateral and debt/income to offer users the ability to learn for what loan interest rates they are eligible when purchasing or refinancing a home. Embodiments of the present invention further provide "what if" calculators allowing users to assess the impact of hypothetical changes to various factors determinative of available loan rates and other circumstances associated with loans.

DESCRIPTION OF THE DRAWINGS

FIG. 8 illustrates a calculator interface allowing the user to assess the impact of credit scores on currently available loan rates associated with different loan types.

DESCRIPTION OF PREFERRED EMBODIMENT(S)

I. Overview

Figure 1:
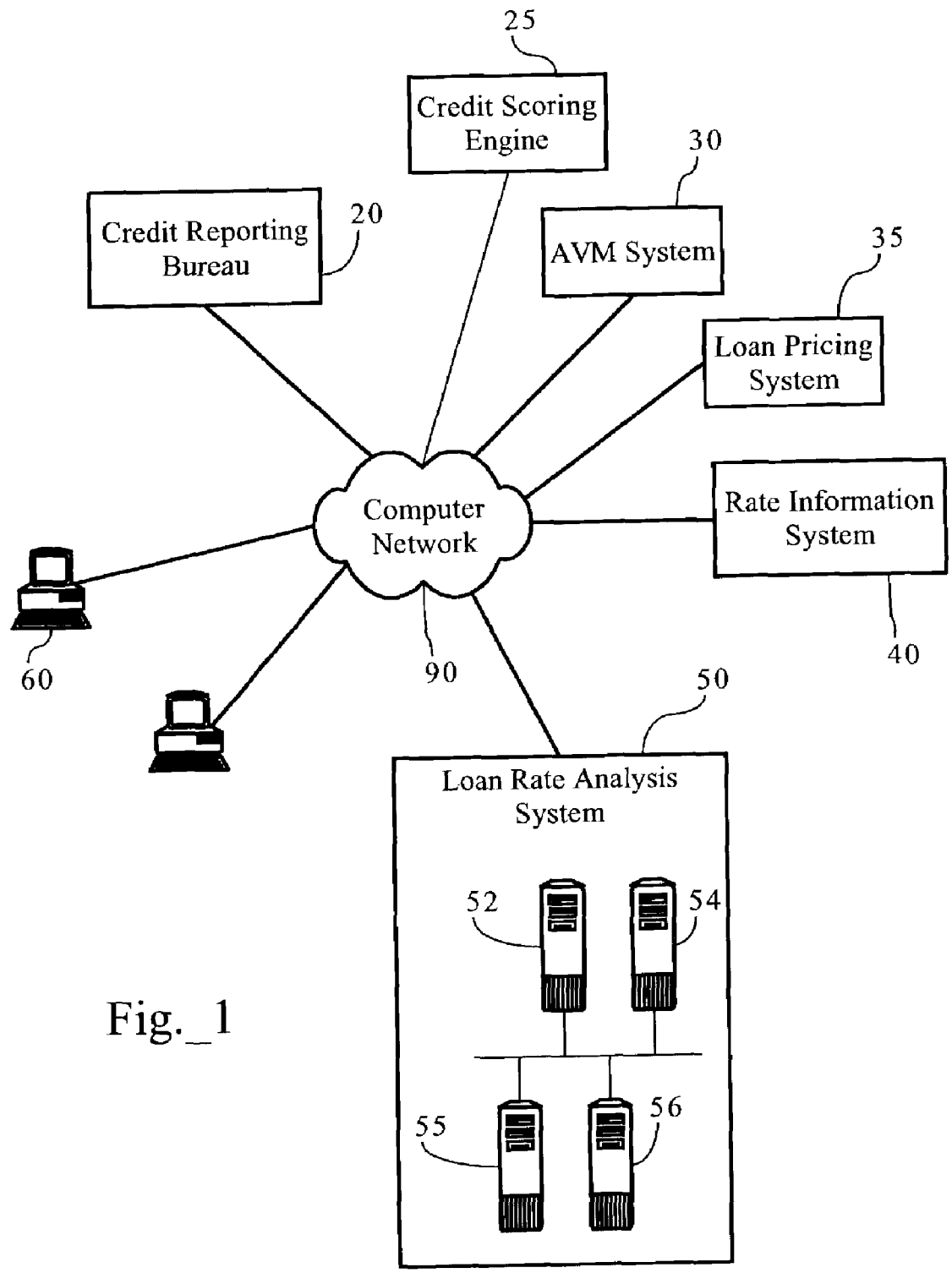
FIG. 1 is a functional block diagram illustrating a computer network environment including a loan rate analysis system according to one embodiment of the present invention.

As FIG. 1 provides, an embodiment of the present invention operates in a computer network environment comprising at least one credit reporting bureau 20, credit scoring engine 25, Automated Valuation Model (AVM) system 30, loan pricing system 35, rate computation system 40, and loan rate analysis system 50. In one embodiment, users access loan rate analysis system 50 over computer network 90 with a network access device, such as client computer 60 including suitable client software, such as a web browser, for transmitting requests and receiving responses over a computer network. However, suitable network access devices include desktop computers, laptop computers, Personal Digital Assistants (PDAs), and any other wireless or wireline device capable of exchanging data over computer network 90 and providing a user interface displaying data received over computer network 90. In one embodiment, computer network 90 is the Internet; however, computer network 90 may be any suitable wide-area computer network.

In one embodiment, loan rate analysis system 50 comprises Web/HTTP server 52, application server 54, database server 56 and web services network gateway 55. Web/HTTP server 52 is operative to establish HTTP or other connections with client computers 60 (or other network access devices) to receive requests for files or other data over computer network 90 and transmit responses in return. In one embodiment, Web/HTTP server 52 passes user requests to application server 54 which composes a response and transmits it to the user via web server 52. In one embodiment, web server 52 establishes a secure connection to transmit data to users and other sites, using the SSL ("Secure Sockets Layer") encryption protocol part of the HTTP(S) ("Secure HTTP") protocol, or any other similar protocol for transmitting confidential or private information over an open computer network. Database server 56 stores the content and other data associated with operation of loan rate analysis system. Application server 54, in one embodiment, includes the functionality handling the overall process flows, described herein, associated with loan rate analysis system 50. Application server 54, in one embodiment, accesses database server 56 for data (e.g., HTML page content, etc.) to generate responses to user requests and transmit them to web server 52 for ultimate transmission to the requesting user. Application server 54 is further operative to provide users with interfaces and tools allowing users to assess loan rate information and, in some embodiments, their borrowing power in connection with a new home or mortgage refinancing loan, as more fully described below. As one skilled in the art will recognize, the distribution of functionality set forth above among web server 52, database server 56 and application server 54 is not required by any constraint. The functionality described herein may be included in a single logical server or module or distributed in separate modules. In addition, the functionality described herein may reside on a single physical server or across multiple physical servers.

Loan rate analysis system 50 further includes network services gateway 55 which implements web services network functionality to process and route service requests and responses over a computer network, such as computer network 90. In one embodiment, network services gateway 55 implements a communications model based on requests and responses. Network services gateway 55 generates and transmits a service request to an external vendor, such as AVM system 30, which receives the request, executes operations on data associated with the request, and returns a response. Network services gateway 55, in one embodiment, further includes other web services functionality such as logging of service requests and responses allowing for tracking of costs and usage of services. As one skilled in the art will recognize, however, other web services architectures, such as broker-based, and peer-to-peer-based, web services network architectures can be employed.

Network services gateway 55, in one embodiment, relies on secure HTTP communications and XML technologies for request and response formats. In one embodiment, network services gateway 55 maintains Document Type Definitions (DTDs) and/or schemas that define the format of the XML request and XML response. Request and response DTDs, in one form, include a message type, transaction identification, vendor/service identification, and an application identification.

Credit reporting bureau 20 maintains a database or other repository of credit history data for at least one individual or other entity, such as the credit reporting services offered by Experian®, Equifax®, and Transunion®. Credit scoring engine 25 is operative to receive credit report data relating to an individual or other entity and process the data against a proprietary or other credit scoring model to yield a credit score. Suitable credit scoring models including a FICO® credit scoring model, CreditXpert®, TransRisk®, or any other suitable credit scoring model. As FIG. 1 shows, credit scoring engine 25, in one embodiment, is remote from loan rate analysis system 50. In one embodiment, credit scoring engine 25 and loan rate analysis system 50 communicate via a XML-based communications model. In other embodiments, the functionality of credit scoring engine 25, as well as credit reporting bureau 20, can be incorporated into loan rate analysis system 50.

Rate information system 40, in one embodiment, maintains a proprietary database including current interest rate information for a variety of loan types (e.g., 30-year fixed mortgage, 15-year fixed mortgage, 60-month new car loan, etc.). Accordingly, the enterprise associated with rate information system 40 monitors bank and other financial institution lending rates and maintains interest rate information in an interest rate database. As to each loan type, each interest rate provided by the interest rate database depends on one to a plurality of parameters. For example, in one embodiment, the present invention operates in connection with a single parameter, such as a credit report score (e.g., FICO®, or CreditXpert® score). Accordingly, rate information system 40 is operative to return the interest rates corresponding to a given credit score a credit score range for one to a plurality of loan types, such as a home loan, auto loan, home equity line, etc. In other embodiments, the returned interest rate(s) depend(s) on a plurality of parameters, such as Credit Score, Conforming or Jumbo Loan, Loan Product, Points, Debt-to-income Ratio, Loan-to-value Ratio, and Customer Type. In one embodiment, loan rate analysis system 50 periodically downloads the interest rate information (or updates thereto) maintained by rate information system 40 and maintains the interest rate information in a locally-cached version of the interest rate database. For example, loan rate analysis system 50 may transmit an XML request, via network services gateway 55, to rate information system 40 on a daily basis (such as a nightly batch process) to request updates to the loan rate database information for use in connection with the methods and systems described herein. In one embodiment, database server 56 maintains the locally-cached version of the interest rate database. In another embodiment, rate information system 40 may be configured to push or publish updates to the interest rate database.

1.1 Summary

As discussed above, the present invention provides methods, apparatuses and systems facilitating analysis of expected interest rates in connection with one to a plurality of different loan types. In some embodiments, the present invention also facilitates analysis of other factors, conditions and/or circumstances associated with a variety of different loan types. In one embodiment, the present invention allows for a network-based application allowing users the ability to assess for what loan interest rates they are eligible based on current interest rate data in light of one factor, such as a credit score, that is typically used to determine interest rate qualifications, or a plurality of additional factors, including debt-to-income or loan-to-value ratios.

In connection with home loans, the present invention, in one embodiment, combines three distinct information gathering and analysis services to provide online consumers with real-time loan rate analysis of unprecedented accuracy. As discussed in more detail below, the present invention, in one embodiment, facilitates analysis of loan rates and the likely circumstances associated with two consumer objectives: mortgage refinancing, and home purchasing. Although many online refinancing and mortgage calculators exist, they require the consumer to provide three important pieces of information: 1) the expected interest rate, 2) the home's current value or the value of a home the consumer wishes to purchase (home valuation), and 3) what the consumer can afford. Often, the consumer is required to estimate these values. Embodiments of the present invention remove the uncertainties associated with such prior art calculators and obtain more accurate inputs to provide an enhanced, industry-data driven approximation of the loan rate terms a particular consumer should expect, given the information provided by the consumer and other data gathered or maintained by the loan rate analysis system 50, as described below. In another embodiment, the present invention facilitates consumer-access to current interest rate data and enables a "what" calculator detailing the current interest rates for one to a plurality of loan types based on credit scores or credit score ranges.

1.2 Data Inputs for Home/Property Loans

The present invention integrates a variety of inputs to provide consumers an enhanced view of loan rate and other borrowing information. In one embodiment, three distinct sources of input associated with the user are used to provide an enhanced analysis of loan rate. The three inputs are: 1) Credit, 2) Collateral, and 3) Capacity.

1.2.a. Credit

The credit factor informs the decision about what kind of interest rate the consumer can secure. In one embodiment, loan rate analysis system 50 obtains credit reporting data from a single credit reporting bureau 20, such as TransUnion®, Equifax®, and/or Experian®, or other credit data repository. In one embodiment, the credit report is used as an input to a credit scoring engine 25 to determine a credit score, such as a FICO® or other credit score. In another embodiment, the system obtains credit reporting data from multiple credit reporting bureaus and merges them into a single report. Co-pending and commonly owned application Ser. No. 09/644,139 filed Aug. 22, 2000 in the name of Guy et al. and entitled "Credit and Financial Information and Management System" discloses methods and systems obtaining credit report data from multiple sources and the merging of such data into a single report (incorporated by reference herein). This pending application also discloses work flows for authenticating users and pulling credit reporting data upon proper authentication of the user. The merged credit report data can then be used as an input to credit scoring engine 25. The credit score, in one embodiment, determines which of several "buckets" or ratings (similar to Prime, Subprime, etc) into which the user falls. As described more fully below, in one embodiment, an existing industry standard table (or other data source or application service) can be used to translate the credit score into a range of allowable interest rates depending on the loan-to-value (LTV) ratio.

1.2.b. Collateral

The collateral factor answers the question of how much the subject property or other asset (such as an automobile) is worth. Collateral, in one embodiment, is determined using a web services application, such as AVM system 30, providing an online home valuation tool that receives a property address or other asset description (such as the year, make and condition of an automobile) and returns a dollar value. In the context of home mortgage refinancing, for example, collateral determines the maximum allowable cash-out amount if the consumer wishes to borrow more than required to pay off the existing mortgage. When buying a home, collateral refers to the value of a home the consumer is interested in purchasing. Section 1.3 includes more information about how an embodiment of the present invention handles refinancing and buying a home differently.

1.2.c. Capacity

Capacity answers the question of how much the consumer can afford to borrow. The consumer, in one embodiment, is prompted to enter income and debt data. Application server 54 may also obtain debt data from the credit report data associated with the user by analyzing the credit report obtained from credit reporting bureau for mortgage and other loan tradelines. The consumer's income to debt ratio will be compared to the mortgage industry's allowable debt maximums (32% mortgage debt/income and 38% total debt/income). In the refinancing context, capacity places an upper limit on the maximum allowable cash-out amount for which the consumer qualifies. Similarly, in the home purchasing context, capacity limits the amount the consumer can borrow to purchase a home.

1.3 Target Users and Differing Flows

The present invention, in one embodiment, facilitates analysis of loan rate and the likely circumstances associated with two different consumer objectives. In one embodiment, loan rate analysis system 50 supports two target users: 1) customers refinancing a mortgage, and 2) customers purchasing a home. However, as one skilled in the art will recognize, the present invention can be applied to other consumer loan contexts, such as loans for automobiles or other consumer products. For each customer type (purchase v. refinancing), the present invention displays what interest rates the customer can expect along with an analysis. The analysis for each customer type emphasizes credit, collateral, and capacity differently. This is because: 1) Homeowners normally have the capacity to afford refinanced mortgage payments that are less than their current mortgage payments (collateral is more important than capacity); and 2) Homebuyers base their purchasing decisions on how much they can borrow (capacity is more important than collateral).

1.3.a. Refinancing

In one embodiment, the present invention provides interest rates and answers two questions for the customer refinancing a mortgage: 1) Is it time to refinance, and 2) For what cash-out amount is the user eligible? The first question, "Is it time to refinance," is answered by comparing the current mortgage terms with the potential mortgage terms calculated by loan rate analysis system 50. For example, if the predicted monthly payment and total interest payment is less than the current monthly payment and total interest payment, the answer may be "It is time to refinance." In one embodiment, other factors, such as closing costs, taxes, insurance payments, and the time the customer plans to hold the property, are also taken into consideration. In one embodiment, the effect of points purchased to reduce interest rates is calculated in the output. The second question, "For what cash-out amount am I eligible?" can be answered by comparing the home-valuation with the customer's capacity.

An abbreviated informational and process break down associated with a customer desiring to obtain interest rate and other information related to mortgage refinancing is:

1) A consumer's credit rating helps to determine eligible interest rates (within a LTV range);

2) Home valuation determines maximum loan allowable with cash-out option;

3) Customer's capacity determines how much of the maximum allowable loan amount he can afford;

5 4) A user interface displays a list of eligible interest rates;

5) A user interface presents an answer as to the question whether it is time to refinance; and 6) A user interface presents an answer to the question how much of the cash-out amount for which the user is eligible.

Note that, in the refinancing context, four additional pieces of information are required: 1) Original loan amount, 2) Original interest rate, 3) Loan period, and 4) Amount of payments made (equity). This factor information, in one embodiment, can be obtained either directly from the user or from the credit report mortgage tradeline from the credit reporting data obtained from one or more credit bureaus.

1.3.b. Home Purchasing

The present invention also provides interest rate and other lending information and, in one embodiment, helps to answer two questions for the consumer seeking to purchase a home: 1) how much can the user borrow, and 2) what is the value of the home in which the user is interested? In one embodiment, the loan interest rates are determined by the consumer's credit rating, combined with the overall loan-to-value (LTV) ratio of the loan. In one embodiment, loan rate analysis system 50 presents the user with a table of possible combinations depending on the number of points purchased. In one embodiment, the system assumes a LTV ratio of 80%; however, the user will be able to manipulate this number using the calculator interface (see FIG. 3 and section 7). The consumer's capacity, the mortgage industry's maximum allowable debt, plus the interest rate information determine the answer to the second question, "How much can the user borrow."

The question, "What is the value of the home in which the user is interested?" is answered using the home valuation component of the loan rate analysis system. This information does not impact the customer's interest rate or allowable loan amount, but is only used to see if the consumer can afford the home in which they are interested.

An abbreviated informational and process breakdown for a customer purchasing a home is:

1) Consumer's credit rating helps to determine eligible interest rates;

2) Customer's capacity determines how much of loan is likely to be allowed; and

3) Value of desired home is compared against eligible loan.

1.4 Mortgage Variables

Several primary variables or factors directly contribute to a customer's eligible loan rate. In turn, several other secondary variables impact the primary variables. This section defines these variables according to an embodiment of the present invention.

| Abbreviation | Description | Who it affects | Where, value comes from |
|---|---|---|---|
| Primary variables (direct impact on loan rate) | | | |
| TYPE | Type of loan (conforming or jumbo) | All | Determined by LOAN amount |
| SCOR | Credit score | All | Pulled from credit report |
| LTV | Loan-to-value ratio | All | Determined by LTV secondary variables |
| DTI | Debt-to-income ratio | All | Determined by DTI secondary variables |
| PROD | Loan product | All | N/A: rates displayed for all loan products |
| PNTS | Points | All | N/A: rates displayed for all point options |
| CUST | Customer (purchase or cash-out refinance) | All | Customer input |
| Secondary variables affecting LTV | | | |
| VAL | Home valuation | All | From AVM engine |
| DOWN | Down-payment | Purchasing | Customer input |
| BAL | Current balance on existing mortgage | Refinancing | From tradeline |
| CASH | Cashout amount | Refinancing | Customer input |
| LOAN | Loan amount | All | Mathematical formula |
| Secondary variables affecting DTI | | | |
| DEBTBAL | Total Debt Balance | All | From tradeline |
| INC | Monthly Income | All | Customer input |
| DEBT | Monthly debt excluding mortgage payment | All | From tradeline |
| MRTG | Monthly mortgage payment | All | Mathematical formula |
| CONS | Amount of debt consolidated with mortgage | Refinancing | Customer input |
| TOTL | Monthly debt including mortgage payment | All | Mathematical formula |
| Output | | | |
| RATE | Interest Rate | All | Pulled from rate sheet |

1.5 Primary Variables Affecting Loan Rate

The primary variables affecting loan interest rates are: 1) Loan type, 2) Credit score, 3) Loan-to-value ratio, 4) Debt-to-income ratio, 5) Loan product, 6) Points purchased, and 7) Type of Consumer.

1.5.1 Loan Type

There are two different types of loans, determined by their size. Conforming loans are below a specified amount and jumbo loans are above a specified amount.

1.5.2 Credit Score

The credit score is obtained as described herein. The credit score determines which of several "buckets" or ratings (similar to Prime, Subprime, etc) into which the user falls.

1.5.3 Loan-to-Value Ratio

The loan to value ratio is the loan amount compared to the value of the home. This ratio is determined by several variables. The most important variable is the value of a home, which, in one embodiment, is determined using an online home valuation tool that receives an address and outputs a dollar value. The other variables that determine the loan-to-value ratio are also outlined herein.

1.5.4 Loan Product

There are several different loan products, each with different interest rates, such as 30-fixed mortgages, 15-year fixed mortgages, adjustable rate mortgages and the like.

1.5.5 Points

Customers can purchase points (equivalent to 1% of the loan amount) to reduce interest rates. 1.5.6 Type of Customer As the above description indicates, the present invention can applied to provide interest rate and other information for users that will either be purchasing a new home (purchasing) or refinancing an existing mortgage (refinancing). Interest rates for refinancing WITH CASHOUT customers are typically higher. Of course, the present invention can be configured to support other consumer loan types, such as new or used car buyers.

2 User Interface

2.1 Flow

Figure 5:
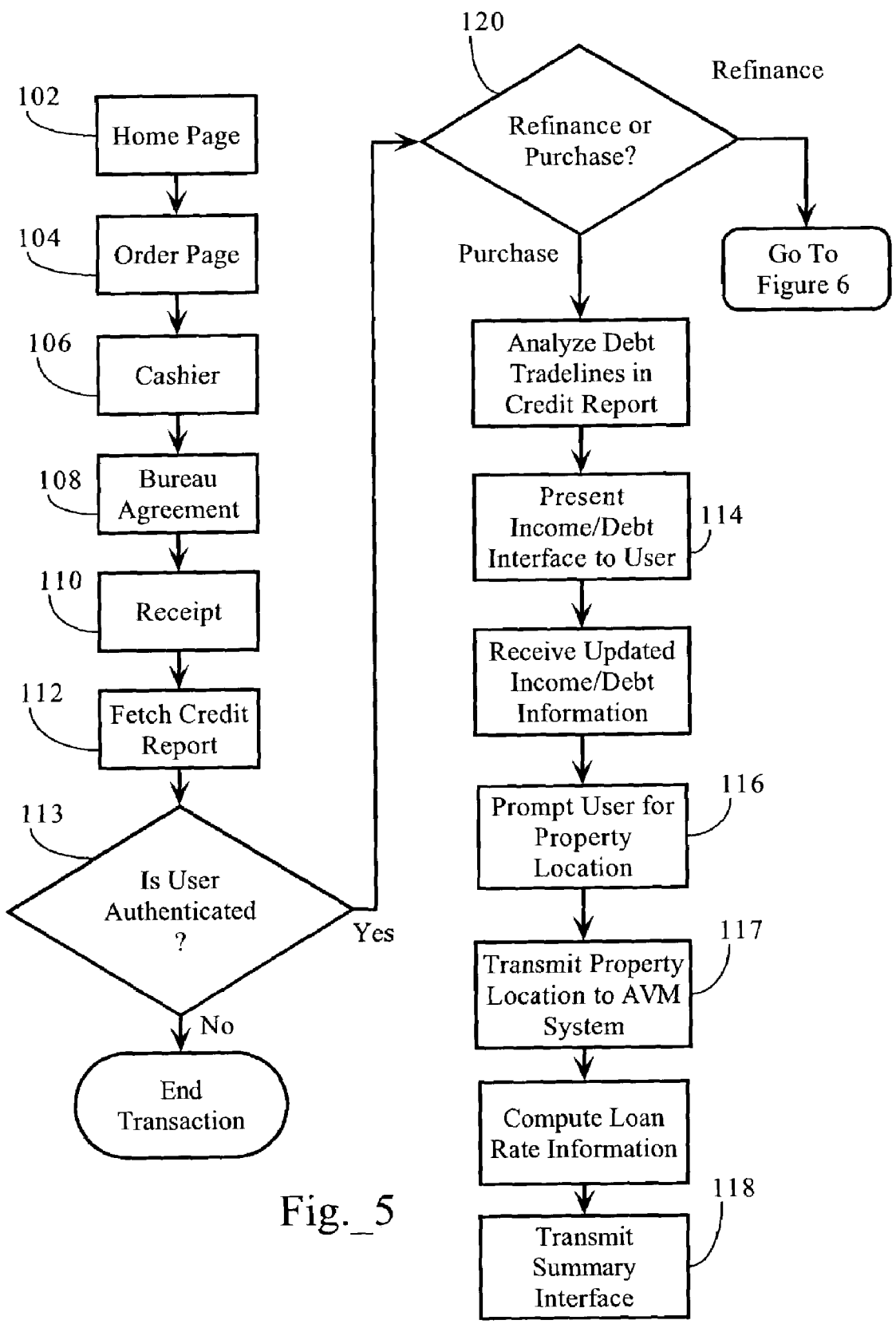
FIG. 5 is a flow chart diagram illustrating the process flow associated with an embodiment of the present invention.
Figure 6:
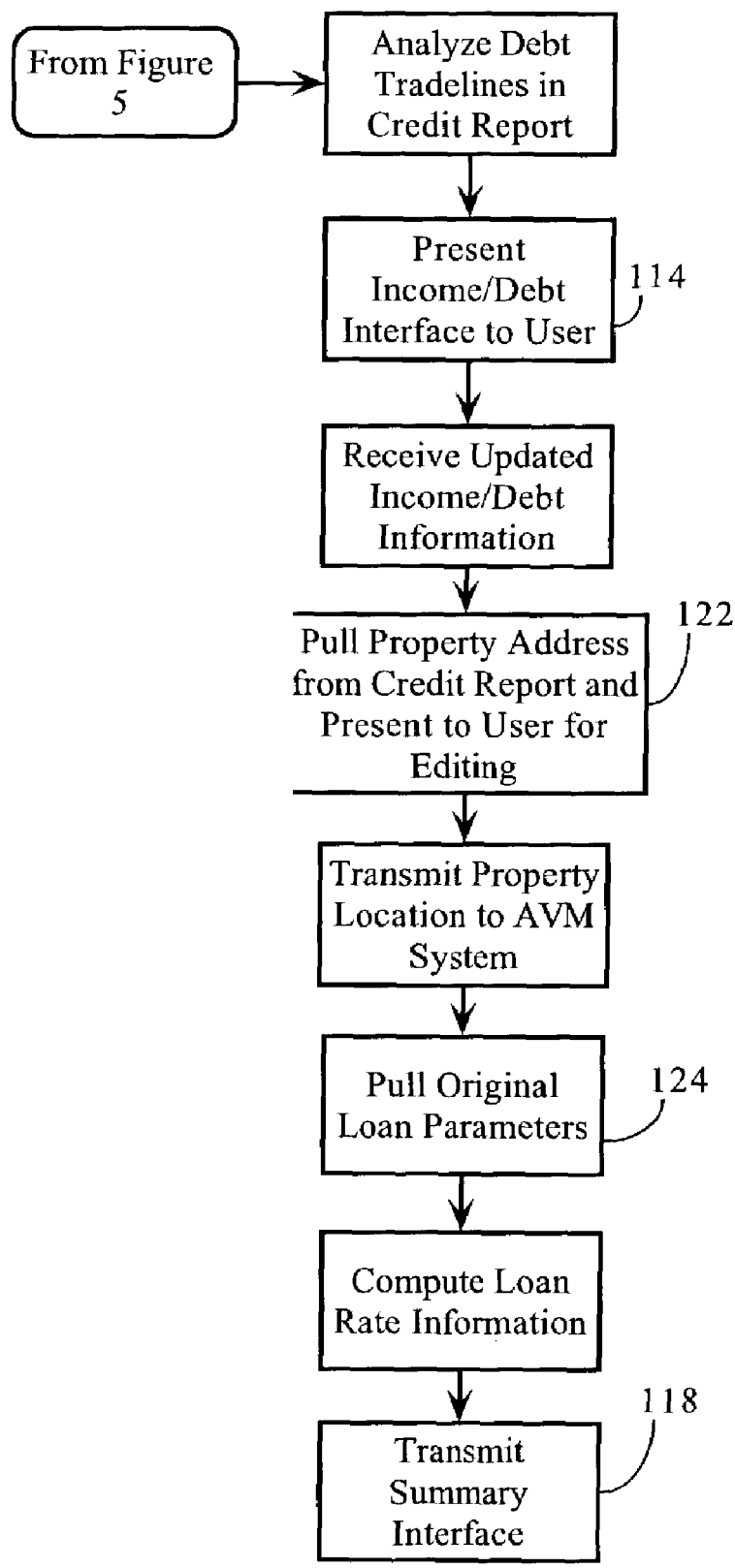
FIG. 6 is a flow chart diagram providing the process flow associated with an embodiment of the present invention.

FIGS. 5 and 6 illustrate the process flows associated with the two different user types discussed above, according to an embodiment of the present invention. FIG. 5 sets forth an exemplary process and work flow associated with facilitating the analysis appropriate to a home or other property purchaser, whereas FIG. 6 provides an exemplary process and work flow associated with facilitating the analysis directed to a consumer desiring to refinance a home or other property.

2.2 Navigation

Data Gathering

Loan rate analysis system 50, in one embodiment, collects the customer input or factor information required to complete the credit, capacity, and collateral sections from a series of sequential pages (refer to the flow diagrams of FIG. 5 and 6). For example and in one embodiment, when a user at client computer 60 accesses loan rate analysis system 50 over computer network 90, (s)he is presented with a home page (step 102) which includes a link to an order page (step 104) including a page-based interface into which the user inputs required data, such as name, address, social security number, etc. To place an order, the user then enters payment information (step 106), such as a credit card account and expiration date, in a cashier interface. The user, in one embodiment, is then presented a form explaining that the user's permission is required to access his/her credit reporting information and that by clicking on a button in the form (s)he is granting such permission (step 108). With such permission, the system formulates a receipt and transmits it to the user (step 110). Loan rate analysis system 50 then transmits a request for a credit report to credit reporting bureau 20 and receives a response (step 112). As discussed above, the system may request credit reports from multiple credit reporting bureaus and merge the data into a single credit report. In one embodiment, the system uses data in the credit report to further authenticate the user according to, for example, a process disclosed in application Ser. No. 09/644,139 (step 113). After the credit report data is returned and processed, the system analyzes the credit report data to determine the liabilities (debts) associated with the user.

Loan rate analysis system 50, in embodiment, then prompts the user for whether he desires to inquire loan rate information in the refinancing or purchasing context (step 120). In the home purchasing context, the system then presents an interface to the user setting forth the detected liabilities (e.g., student loans, car loans, credit card debt, existing mortgage debt, etc.). In one embodiment, the user interface prompts the user to enter income information (e.g., monthly salary, and/or income from other sources) and supplement liability information to enable a determination of the Debt-to-Income ratio for the user (step 114). The system then transmits another interface to the user prompting him/her for the address of the property that will be the subject of the loan (step 116). As discussed herein, loan rate analysis system 50 transmits the property identifying information to AVM system 30 which returns a property value (step 117). In one embodiment, a graphic indicator is used to let the customer know throughout this process how far away the analysis is (for example, 'You are on page 2 of 3').

Analysis

Figure 4:
FIG. 4 illustrates a user interface that displays a home valuation returned by an asset valuation engine given the inputs generated by the system.

Once the user input is complete, loan rate analysis system 50 computes the loan rate information for the user as described herein. In one embodiment, loan rate analysis system 50 then transmits an analysis page to the user with a table of the calculated interest rates and summarized credit, capacity, and collateral information (step 118). See also FIG. 2. On top of this page (and, in one embodiment, all pages related to the analysis) are tabs representing the main functional sections supported by Loan rate analysis system 50: 1) Analysis page, 2) Calculator, 3) Credit details, 4) Capacity details, and 5) Collateral details (see FIG. 4). The user can easily navigate throughout the different sections of the analysis using these tabs. As well, hyperlinks are used to reinforce when another tab is relevant. For example, on the analysis page, the credit score summary section includes a hyperlink to the credit details page.

2.3 Required Inputs and Outputs

Inputs-Purchase or Refinance?

As discussed above, in the home lending context, the user will answer a question on the order form that sets a flag directing which process flow will be applied. If the user indicates that (s)he owns the subject property, the system applies the refinance process flow (see step 120 and FIG. 6). Otherwise, the system applies a home purchase process flow.

2.3.1.1 Refinance Inputs

The following additional information is pulled from the credit report mortgage tradeline obtained from credit reporting bureau(s) 20 to enable a refinancing analysis (step 124): 1) Original loan amount; 2) Original interest rate, 3) Original terms, and 4) Payments made.

Home Valuation Estimator

In order to provide an estimate of a home's value the user can input at least one address corresponding to a subject property. For the refinancing process flow, the loan rate analysis system 50 asks the user for address information, and utilizes the automated valuation system 30 to acquire valuation information from a third party system. This information is user-editable, running new addresses for a small fee for each new address (see section 4 for details).

Figure 2:
FIG. 2 illustrates a user interface that displays the various rates a user can expect when applying for a new loan given the inputs generated and gathered by the system.

2.3.2 Outputs (see FIG. 2)

2.3.2.1 Homebuyer

The analysis interface, in one embodiment, provides the user with a range of APRs, loan amounts, Loan-To-Value, etc. that indicate what to expect when applying for a loan. In the home purchasing context, LTV=(home value−down payment)/home value.

2.3.2.2 Refinance, No Cashout In the refinancing situation, the user is presented with a range of APR's depending on the number of points purchased. The calculation will assume the loan amount is to pay off the existing mortgage, without a cashout option. The LTV in this example equals (Original loan less payments made)/new valuation.

2.3.2.3 Refinance, Cashout

Because the user is potentially interested in borrowing as much as possible in order to get a cash amount paid to him/ her, he/she is shown information corresponding to a range of possible loans between the minimum required to pay off the original loan and the maximum loan amount based on the user's capacity.

LTV=(New valuation minus payments made) new valuation

3 Credit Component

3.1 Technology

As discussed above, the Credit gathering aspect of the present invention, in one embodiment, takes advantage of existing, proprietary credit reporting and scoring services. In one embodiment, credit reporting bureau(s) 20 offer web-based credit reporting applications accessible to loan rate analysis system 50 via web services functionality, such as network services gateway 55. Accordingly, in one embodiment, loan rate analysis system 50 formulates a proprietary request for a credit file, including data sufficient to identify the user, and transmits it to credit reporting bureau 20 via network services gateway 55. Credit reporting bureau 20 responds to the a synchronous or synchronous request by transmitting proprietary response including the credit report data corresponding to the user to loan rate analysis system 50. As discussed above, loan rate analysis system 50, in one embodiment, then transmits the credit reporting data to credit scoring engine 25. As discussed above, credit scoring engine 25 then processes the credit report data and returns a credit score. In one embodiment, the functionality of credit scoring engine 25 is incorporated into credit reporting bureau 20, which returns the credit report data and a credit score to loan rate analysis system 50.

3.2 User Experience

FIG. 2 illustrates a summary analysis interface detailing interest rate and other information concerning a home loan based on the inputs and outputs discussed above. The credit score, such as a FICO® or CreditXpert score®, is summarized on the analysis page. Specific details about the credit score are on a separate page, accessible from a tab at the top of all pages as well as hyperlinks near the score. This detail page displays the FICO® (or other credit) score explanation page. From here, the user can drill down further to view a single credit report, such as a TransUnion® credit report.

4 Collateral Component

4.1 Summary

The collateral component of embodiments of the present invention operates in connection with a property valuation tool. In one embodiment, the property valuation tool is an automated valuation model (AVM) provided by a third-party AVM system 30. Similar to above, loan rate analysis system 50 employs a HTTP(S)/XML-based request/response communication model (involving, in one embodiment, network services gateway 55) to retrieve property valuations from AVM system 30.

4.2 Inputs

During the information gathering section, the consumer provides the: 1) Street Address, 2) City, 3) State, and 4) Zip code. In the refinancing context, loan rate analysis system 50 pre-populates these data fields with either the address entered in the payment section of the work flow or, assuming the information exists in the credit report data, information pulled from the mortgage tradeline in the credit report associated with the user. In either situation, the data fields are editable by the user. Loan rate analysis system 50 also pulls the following information from the mortgage tradeline credit report data associated with the user: 1) Original Loan Amount, 2) Original Interest Rate, 3) Original Terms, and 4) Number of Payments Made To Date.

4.3 Outputs

As discussed herein, the result of the home valuation is used as a factor in the analysis of the mortgage/refinance rate, and summarized on the analysis tab (see FIG. 2). In one embodiment, the collateral detail page (see FIG. 4) includes specific details regarding the valuation, including: 1) The target home address, 2) Description of the home, 3) Reasonable valuation, and 4) Comparable home values in the vicinity of the target address. In one embodiment, the reasonable valuation comprises three components: a highest reasonable valuation, a lowest reasonable valuation and a confidence level. In this embodiment, the computed collateral value is the mean of the highest and lowest reasonable valuations. The confidence level presented by certain embodiments of the present invention indicates the accuracy of the returned valuation. Using the confidence level, the customer can decide whether or not to override the valuation used for the interest rate and other lending computations. The collateral detail page also includes the value used for interest rate calculations. In one embodiment, the analysis interface provides the user an option of filling in a desired value by clicking an 'Override' button. The user may choose to do this if the confidence value is low, or if he/she has additional information concerning the home or other property.

4.4 AVM System

Communication

Figure 7:
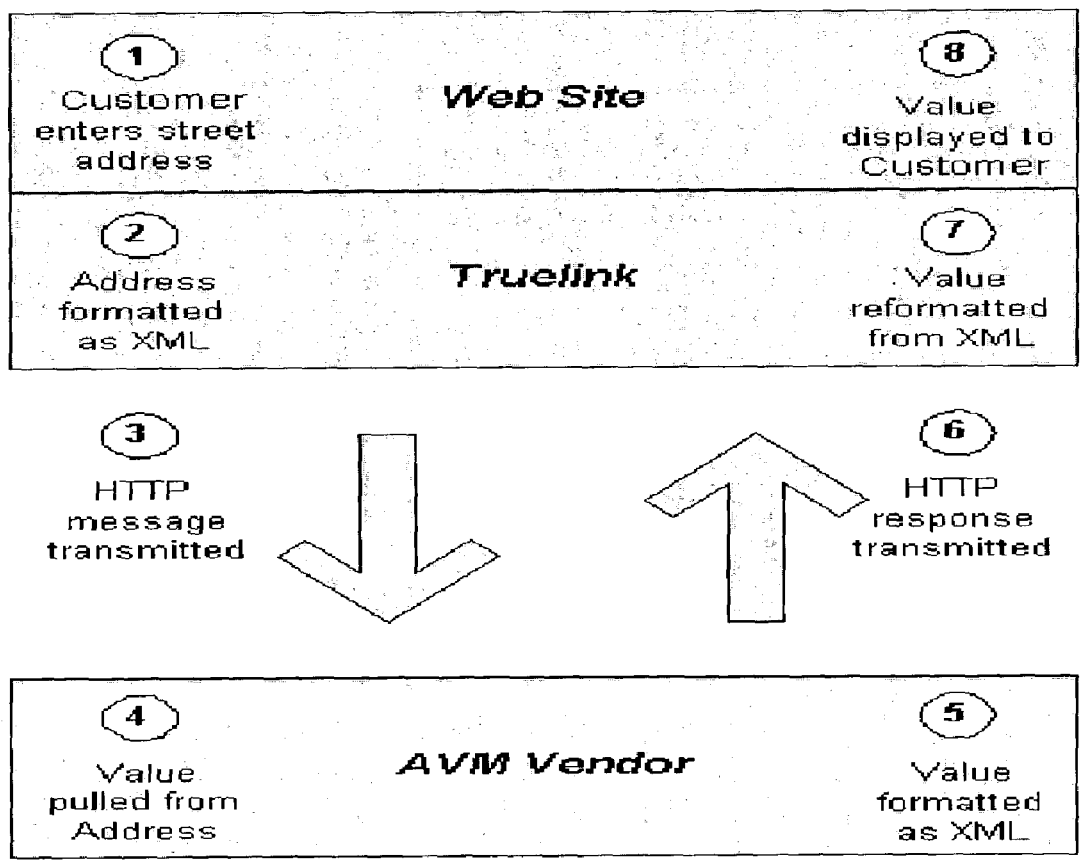
FIG. 7 is a block diagram illustrating the flow of data involved in processing a request for Automated Valuation Services according to an embodiment of the present invention.

Communication with the AVM system 30, in one embodiment, consists of a street address and other location information in an XML request sent via HTTP(S). Loan rate analysis system 50 initiates the request in response to user input. The response from AVM system 30, in one embodiment, includes the reasonable dollar value, description and if available, comparable home values. FIG. 7 illustrates the process flow associated with communication between loan rate analysis system 50 and AVM system 30 via network services gateway 55.

Hit Rate

Ideally, AVM system 30 would be able to provide a high hit rate, such as 95%. In the situations when a valuation cannot be returned, the customer will be prompted to enter an estimated value.

Additional searches

In one embodiment, loan rate analysis system 50 allows the user the option to obtain new valuations for additional homes.

4.5 Valuation's Impact on Interest Rates

4.5.1 Home purchasing:

The valuation of the subject property primarily affects the calculated loan-to-value (LTV) ratio. In addition, the returned home valuation (VAL) minus the down payment (DOWN) determines the loan amount (LOAN). The loan amount (LOAN) divided by the home valuation (VAL) determines the loan-to-value ratio (LTV) which directly impacts the interest rate.

4.5.1.1 Required inputs:

As discussed above, the home valuation (VAL) is returned by AVM system 30 based on address information inputted by the user, or gathered from other sources. The user further provides an anticipated down payment (DOWN). The loan-to-value ratio (LTV) is determined, as discussed below, according to the following formulas.

4.5.1.2 Formulas used with examples:

4.5.1.2.1

LOAN=VAL−DOWN
LOAN=$100,000−$20,000
LOAN=$80,000

4.5.1.2.2

LTV=LOAN/VAL
LTV=$80,000/$100,000
LTV=80%

4.5.2 Refinancing:

In the refinancing context, property valuation primarily affects the loan-to-value ratio. The existing mortgage loan balance (BAL) and the desired cashout amount (CASH), if any, plus debt to consolidate (CONS) determines the loan amount (LOAN). The loan amount (LOAN) divided by the home valuation (VAL) determines the loan-to-value ratio (LTV) which directly impacts the interest rate.

4.5.2.1 Required inputs:

As discussed above, the property valuation (VAL) is returned by AVM system 30 or any other suitable valuation engine based on address information inputted by the user. The mortgage loan balance (BAL) is pulled from the credit report tradeline. The cash out amount (CASH) is inputted by the user during the order process. The debt to consolidate (CONS) is also inputted by the user during the order process by selecting from the list of debts. As above, the loan-to-value ratio (LTV) is derived from a formula.

4.5.2.2 Formulas used with examples:

4.5.2.2.1
LOAN=BAL+CASH+CONS
LOAN=$60,000+$10,000+$20,000
LOAN=$90,000

4.5.2.2.2
LTV=LOAN/VALUE
LTV=$90,000/$100,000
LTV=90%

5 Capacity Component

5.1 Technology

In one embodiment, loan rate analysis system 50 computes a debt-to-income (DTI) for the user given the liability and income inputs discussed above.

5.2 User Experience

As FIG. 2 shows, the user's debt-to-income ratio is summarized on the analysis page. Specific details about the customer's capacity are available on a separate page, accessible from a tab at the top of all pages as well as hyperlinks near the DTI ratio. This detail page, in one embodiment, displays the user's debts as pulled from credit reporting data, and potentially modified/supplemented by the user. In one embodiment, the reports provided to refinancing users contain their existing mortgage information. Note, however, the present invention does not include this mortgage payment when calculating capacity, because the amount currently being paid on the existing mortgage would be replaced by the amount for the new mortgage. The new homebuyer will not have a current mortgage tradeline to consider.

6 Interest Rate Computation

6.1 Summary

One objective of the loan rate analysis system 50 is to inform customers about the best interest rate for which they may be eligible based on industry-driven data. This section outlines how such expected interest rates are computed and delivered to users according to one embodiment of the present invention.

6.2 Method

In one embodiment, a third party system, such as rate information system supplies loan rate analysis system 50 with a database of current interest rates for one to a plurality of different loan types. Each interest rate provided in the database is associated with and dependent on one to several variables. As discussed above, during the information gathering process, the customer has supplied information that enables loan rate analysis system 50 to determine the values of these variables for the specific customer. In one embodiment, the variables used to determine expected interest rates are: 1) Credit Score-SCOR, 2) Conforming or Jumbo Loan-TYPE, 3) Loan Product-PROD, 4) Points-PNTS, 5) Debt-to-income Ratio-DTI, 6) Loan-to-value Ratio-LTV, and 7) Customer type-CUST.

Earlier sections of this document have detailed how to ascertain the variable values using a combination of customer supplied factor information, third party data engines, and mathematical formulas. The values are 'plugged' into the provided interest rate database to determine the interest rates.

6.3 Possible Variable Values

The following sets forth possible variable values according to an embodiment of the present invention.

6.3.1 Loan Type (TYPE):
6.3.1.1 Conforming
6.3.1.2 Non-conforming

6.3.2 Credit Score Range (SCOR):
6.3.2.1 <=500
6.3.2.2 501-600 (inclusive)
6.3.2.3 601-620 (inclusive)
6.3.2.4 621-660 (inclusive)
6.3.2.5 661-700 (inclusive)
6.3.2.6 >700

6.3.3 Loan-to-value Ratio Range (LTV):
6.3.3.1 <=80
6.3.3.2 80.01-90 (inclusive)
6.3.3.3 90.01-95.00 (inclusive)
6.3.3.4 95.01-103.00 (inclusive)

6.3.4 Debt-to-income Ratio Range (DTI):
6.3.4.1 <35
6.3.4.2 35-38 (inclusive)
6.3.4.3 38.01-45 (inclusive)
6.3.4.4 45.01-55 (inclusive)
6.3.4.5 55.01-65 (inclusive)

6.3.5 Loan Product (PROD):
6.3.5.1 30 Year Fixed
6.3.5.2 15 Year Fixed
6.3.5.3 5/1 ARM
6.3.5.4 3/1 ARM
6.3.5.5 1 Year ARM
6.3.5.6 6 Month Arm
5 6.3.5.7 Sub-Prime 1
6.3.5.8 Sub-Prime 2

6.3.6 Points (PNTS):
6.3.6.1 0
6.3.6.2 1

6.3.7 Customer Type (CUST)
6.3.7.1 Purchasing or Refinancing with no cashout/debt consolidation,
6.3.7.2 Refinancing with cashout/debt consolidation.

6.4 Output

As FIG. 2 illustrates, the analysis page, in one embodiment, displays interest rates for a plurality of different loan types in a table format. Furthermore, the analysis page in one embodiment further includes a pull down menu that allows the user to determine the effect of purchasing points on the expected interest rates shown.

6.5 Special consideration-DTI

Most of the primary values discussed above can simply be 'plugged' into the interest rate database to determine the best eligible interest rate. The Debt-to-Income ratio (DTI) requires special consideration. As detailed herein, the DTI is directly impacted by the customer's monthly debt load. A customer's monthly mortgage payment would contribute to monthly debt, therefore impacting the DTI. The system cannot determine the monthly mortgage payment without first knowing the eligible interest rate, yet it cannot determine the monthly interest rate without knowing the user's DTI which depends on the monthly mortgage payment. In order to overcome this circular logic, one embodiment of the present invention implements the following steps to correctly determine the correct best interest rate. This explanation will make use of the sample grid below.

In one embodiment, loan rate analysis system 50 uses the SCOR, TYPE, and LTV determined during the customer information gathering stage to narrow down the list of possible interest rates. The system, in one embodiment, displays interest rates for each loan product (PROD) and point value (PNTS) to the user, so these steps will have to be repeated for each PROD and PNTS. For simplification, the grid only shows sample rates for PROD "30 Year Fixed" and PNTS "0". Note that there will be 5 possible interest rates, one for each DTI range. In the sample grid below, the third party interest rate database indicates that for customers with a DTI between 35 and 38 percent, they will be eligible for an interest rate of 5.50%. Loan rate analysis system 50 then calculates the monthly mortgage (MRTG) payment for each possible interest rate. To calculate the monthly mortgage payment, loan rate analysis system 50 uses the following formula:

MRTG = LOAN * (((RATE/12) * (POWER(((RATE/12) + 1), PYMS)))/((POWER((1 + (RATE/12)), PYMS)) − 1))

Note:
Interest rate (RATE) is pulled from the table but must be converted into a decimal by dividing it by 100 (5/100 = 0.05).
Note:
Number of monthly payments (PYMS) is the total loan years × 12 months. This equals 360 for all loan products except the "15 Year Fixed" which is 180 (15 years multiplied by 12 months).

Loan rate analysis system 50 then adds the calculated monthly mortgage payment (MRTG) to the customer's existing monthly debt payments (DEBT) to determine the total possible monthly debt (TOTL) payment for each interest rate. In the example grid, the customer would have a monthly mortgage payment of $429.46 at an interest rate of 5%. After adding this mortgage payment to the customer's other monthly debt of $1,000.00, it is calculated that the customer's total monthly debt payment would be $1,429.46. Loan rate analysis system 50 then repeats this process for each possible interest rate.

After calculating the customer's total monthly debt payments (TOTL) for each interest rate, loan rate analysis system 50 calculates the customer's DTI ratio for each interest rate by dividing the total monthly debt (TOTL) by the customer's monthly income (INC). In the sample grid, the customer's DTI is 35.74% at an interest rate of 5%. Notice that after the calculations each column has two DTI's. The fixed DTI (fDTI) is the debt-to-income rate range provided in the rate sheet that the customer must meet in order to be eligible for that ratio's interest rate. The calculated DTI (EDTI) is the customer's actual debt-to-income ratio as determine by the customer's monthly debt load and calculated in the previous steps. To determine which best interest rate the customer is eligible for, loan rate analysis system 50 compares each column's fDTI and cDTI. The column of the lowest interest rate where the cDTI falls within the range of the fDTI is the best interest rate. In the sample grid, the fDTI for the first column is "<35". The customer's cDTI must fall within the fDTI's range in order to be eligible for that column's interest rate. In the first column of the sample grid, the customer's cDTI of 35.74% does not fall in the fDTI's range of "<35". Therefore the customer is not eligible for an interest rate of "5%". In the second column, the cDTI does fall into the fDTI's range. Therefore the interest rate in this column, 5.5%, is the best interest rate for this user.

| Sample Rate Grid | |
|---|---|
| Loan Amount | $80,000.00 |
| Monthly Income | $4,000.00 |
| Monthly Debt | $1,000.00 |

| | Fixed DTI: | | | | |
|---|---|---|---|---|---|
| 30 Year Fixed 0 Points | LTV <80 <35 5.00% | 35-38 5.50% | 38.01-45 6.00% | 45.01-55 6.50% | 55.01-65 7.00% |
| mortgage debt: | $429.46 | $454.23 | $479.64 | $505.65 | $532.24 |
| total debt: | $1,429.46 | $1,454.23 | $1,479.64 | $1,505.65 | $1,532.24 |
| customer's DTI: | 35.74% | 36.36% | 36.99% | 37.64% | 38.31% |

6.6 No Rate

Not all combinations of variables will have rates. When no rates are available, loan rate analysis system 50 replaces the rate table with the text, "No rates available, please attempt to reduce your loan-to-value and debt-to-income ratios."

6.7 Subprime Rates

Higher risk borrowers generally only qualify for subprime loans (the prime loans will have no interest rate associated with them). In one embodiment, loan rate analysis system 50 only displays loan types that have an available interest rate associated with them. In one embodiment, if a consumer is eligible for sub-prime and prime loans, loan rate analysis system 50 only displays the prime loans.

7 The Loan Rate Calculator Interface 7.1 Summary

Figure 8:
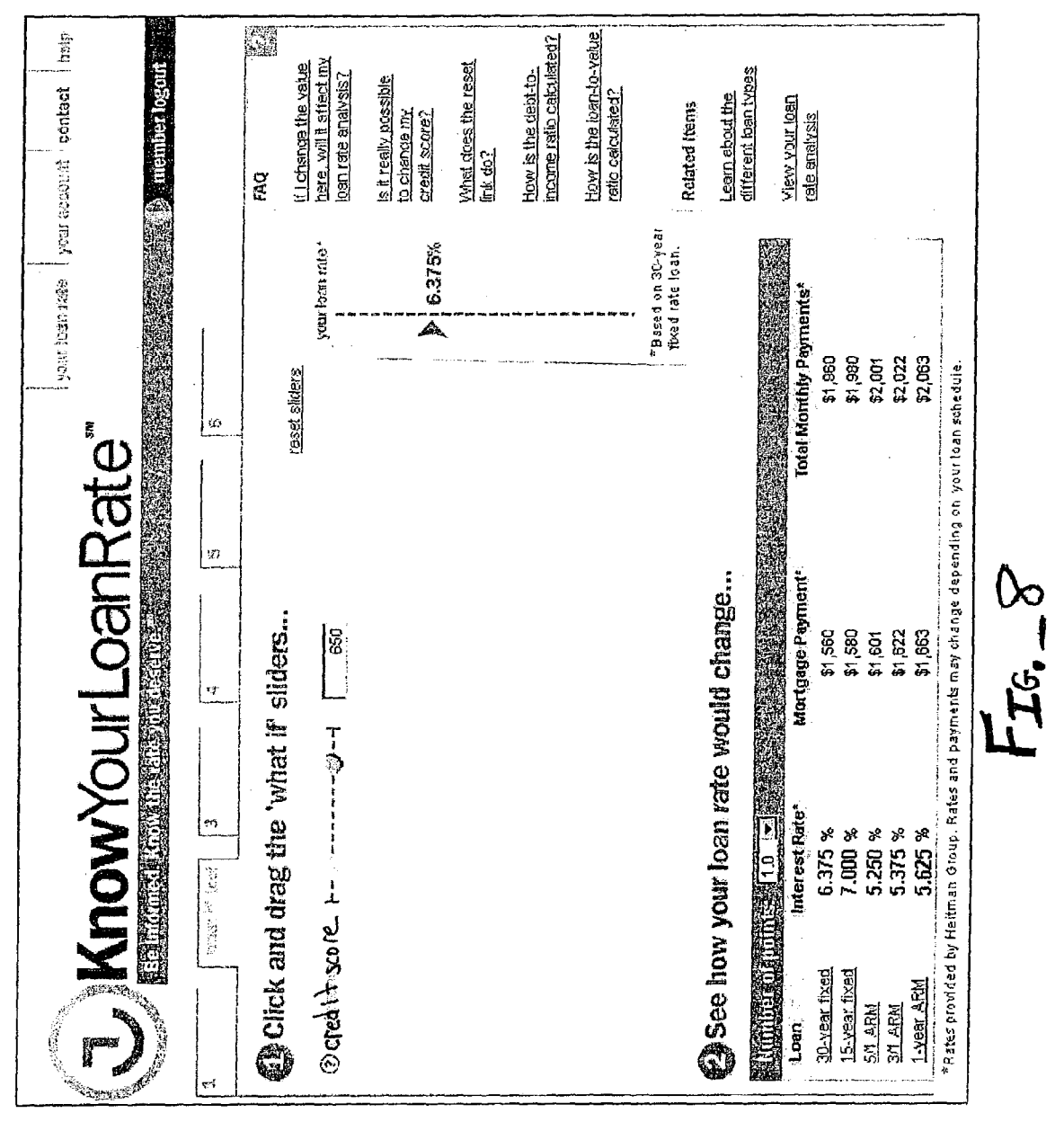

In one embodiment, loan rate analysis system 50 provides a calculator interface allowing users to manipulate the values for one to a plurality of factors commonly used to compute interest rates, and to determine the effects of such manipulations on expected interest rates. See FIGS. 3 and 8. As FIG. 8 shows, the calculator interface, in one embodiment, displays current interest rates for at least one loan type based on a given FICO® or other credit score. As discussed above, loan rate analysis system 50 obtains current interest rate data from rate information system 40 and stores it in a local database. In one embodiment, inputting a particular credit score yields an interest rate for at least one loan type (e.g., 30-year fixed mortgage, 60-month new car loan, etc.). As FIG. 8 shows, the calculator interface includes a slider control allowing the user to adjust the credit score and determine the effect of changes in the credit score on currently available interest rates. In one embodiment, the starting position of the credit score is the user's actual credit score, as obtained by pulling a credit report and having a credit scoring engine 25 process it (see above). However, in another embodiment, the starting position can be a default score based on a national average credit score. As one skilled in the art will recognize, the calculator interface can be implemented with other controls beyond slider controls. For example, the user can input a credit score into an editable credit score field. In another embodiment, the user can select a credit score range (e.g., 600-650, etc.) from a pull-down menu.

Figure 3:
FIG. 3 sets forth a user interface allowing the user to assess the impact of changes to various inputs affecting the interest rates a user could expect in connection with a prospective loan.

7.2 Additional Factors:

However, as FIG. 3 shows, the calculator interface and interest rate analyses can include additional factors, some or all of which can be adjusted. Such adjustable values can include: 1) Credit score, 2) Debt-to-income ratio, 3) Collateral, and 4) Loan amount. As the user manipulates the sliders or other interface controls, the interest rate table is updated to reflect the new factor values used to compute expected interest rates.

7.3 Objectives

The calculator interface achieves at least two goals: First, it allows the user to see how different values may affect their rates. Second, it educates users as to how each component value affects the interest rate individually and relative to other components.

7.4 User Input

In one embodiment, the calculator interface includes four sliders, one to represent the credit score, debt-to-income ratio, collateral, and loan amount. In the refinancing context, the calculator interface may further include a cashout amount slider and a consolidated debt slider. Each slider will be pre-populated with the values determined during the data gathering process. The user can manipulate each slider by moving a control left or right using the mouse, or by inputting a new numeric value into a text box using the keyboard. As FIG. 3 shows, the calculator interface displays the actual values. In one embodiment, when a user changes a value from the actual value (as determined during the data gather phase), the actual value will be place-marked with a small dot or other marker. The collateral and loan amount sliders affect a LTV field. Even though this field is not directly editable, the LTV value changes as the user alters either the collateral or loan amount values.

7.5 Output-Rate Table

A rate table 201 automatically reflects changes to a slider in real-time. The table 201 will display varying rates and monthly payments to points purchased. The rates computed for a user are obtained by known processes and can be obtained using any suitable means. For example, rate information, in one embodiment, is obtained from a third party rate information system 40, which maintains a database operative to return applicable interest rates given a user's credit score, DTI and LTV values. In a preferred embodiment, however, the interest rate database is maintained internally relative to loan rate analysis system 50. In one embodiment, loan rate analysis system 50, as discussed above, polls external sources for applicable interest rate information and uses the information to populate a proprietary interest rate information database. The interest rates displayed default to the rates corresponding to a 30-Year fixed term, but the user has the option of changing the loan type using a drop down box.

Other Sliders

Every slider that is manipulated will in turn manipulate any slider that is affected by the change. This will reinforce for the customer the relationship between the different components. For example, as the user increases the loan amount, the user's debt-to-income ration increases, decreasing the user's capacity to pay on more debt.

7.6 Changing Actual Values

In one embodiment, the calculator interface is intended primarily for creating 'what if' scenarios. For example, actual credit scores cannot be changed in the short-term, yet the calculator interface allows the customer to change the credit score to see what the result would be. It is important that the interface communicate the difference between these 'what-if' values and the actual values used for computing the analysis. It is possible that some 'actual' values, such as capacity, may need to be edited. For example, the customer may remember a debt that was not included in the debt-to-income analysis. To edit these 'actual' values, the customer can either select the capacity tab or choose a hyperlink near the capacity slider. Both will jump to the detail page where the real values can be edited.

7.7 Technology

The calculator interface can be implemented using any suitable technologies, including client side implementations, such as a Java applet, or Flash Media Player, or any suitable browser plug-in or module. In one embodiment, a Java applet includes executable code and a local interest rate database allowing for real-time population of the rate table displayed on the calculator interface. In one embodiment, the local interest rate database includes a subset of the interest rate information obtained from rate information system 40 centered around the initial component results (credit, collateral, and capacity). In another embodiment, manipulation of the sliders causes the client-side module to transmit requests for updated rate table information to loan rate analysis system 50.

8 Real-Time Loan Qualification

8.1 Summary

In one embodiment, loan rate analysis system 50 supports process flows allowing users to receive real-time loan loan-pricing and approvals based on the inputs gathered and the ensuing analysis of loan rate (see above).

8.2 Data Exchange

In one embodiment, loan rate analysis system 50 provides a real-time loan pricing system 35, such as IndyMac's Quick-Pricer system, with:

8.2.1.1 Credit data,
8.2.1.2 Debt data,
8.2.1.3 Income data, and
8.2.1.4 Property valuation data.

Loan pricing system 35 in return provides loan qualification/approval indication pricing.

8.3 Linking to Loan Pricing System

Where the pricing is displayed, the present invention also provides a link to a lender's full-loan application module.

Although the present invention has been described relative to specific embodiments, it is not so limited. Many modifications and variations of the embodiments described above will become apparent. For example, although the embodiments described above employed HTTP(S) and XML protocols and technologies, the present invention can use any suitable communications and data exchange technologies and protocols. In addition, although embodiments of the present invention have primarily been described as operating in the context of home loans, the present invention can be adapted to auto loans, as well as commercial loans. Furthermore, other changes in the details, steps and arrangement of various elements may be made by those of ordinary skill in the art without departing from the scope of the present invention. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A loan rate analysis system, comprising
    a credit data repository maintaining credit history data associated with at least one entity;

a credit scoring engine operative to receive credit report data relating to an individual or other entity and process the data against a credit scoring model to yield a credit score;

a rate information database storing interest rate information for at least one loan type, and operative to return the interest rate(s) corresponding to a given credit score for at least one desired loan type; and a server operative to: receive requests from users over a computer network and transmit responses in return, to interact with a user to obtain information allowing for the retrieval of credit report data, interact with the credit data repository to obtain the credit history data associated with the user, transmit at least a portion of the credit history data to the scoring engine to receive a credit score in return, access the rate information database for current interest rate information for at least one loan type, and determine an interest rate for the loan type based on the interest rate information and the credit score associated with the user; and an interest rate calculator interface comprising a credit score field including a credit score value;

a credit score field interface control allowing a user to change the credit score value in the credit score field; and an interest rate field displaying at least one loan type and a corresponding interest rate based at least in part on the current credit score value in the credit score field, wherein the interest rate displayed in the interest rate field of the calculator interface is responsive to manipulation of the credit score interface control;

wherein the server is operative to populate the credit score field with the credit score obtained from the credit scoring system and the interest rate field from the interest rate data obtained from the rate information database.

2. The loan rate analysis system of claim 1 wherein the interest rate calculator interface is implemented within the context of a browser resident on a client computer.

3. The loan rate analysis system of claim 1 wherein the interest rate calculator interface is a Java applet operating within the context of a browser.

4. The loan rate analysis system of claim 1 wherein the credit score field interface control comprises a slider interface control.

5. The loan rate analysis system of claim 1 wherein the interest rate calculator interface further comprises a capacity field including a capacity value corresponding to the debt-to-income ratio associated with the user in relation to a contemplated loan;

a capacity field interface control allowing a user to change the capacity value in the capacity field;

wherein the server is operative to populate the capacity field with a capacity value based on factor information provided by the user and/or obtained from the credit report data associated with the user, and wherein the server is operative to populate the interest rate field based on the credit score obtained, from the credit scoring system, the capacity value computed by the server, and the interest rate data obtained from the rate information system, and wherein the interest rate displayed in the interest rate field of the calculator interface is responsive to manipulation of the capacity field interface control and/or the credit score interface control.

6. The loan rate analysis system of claim 1 wherein the interest rate calculator interface further comprises a collateral field including a collateral value indicating the value of an asset associated with a loan type;

a collateral field interface control allowing a user to change the collateral value in the collateral field;

wherein the server is operative to populate the collateral field with a collateral value provided by the user, and wherein the server is operative to populate the interest rate field based on the credit score obtained from the credit scoring system, the collateral value provided by the user, and the interest rate data obtained from the rate information system.

7. The loan rate analysis system of claim 1 further comprising an asset valuation system operative to provide an estimated value of a subject property; and wherein the server is operative to prompt the user for information identifying the property and transmit the information to the asset valuation system;

wherein the interest rate calculator interface further comprises a collateral field including a collateral value indicating the value of an asset associated with a loan type;

a collateral field interface control allowing a user to change the collateral value in the collateral field;

wherein the server is operative to populate the collateral field with a collateral value provided by the asset valuation system, and wherein the server is operative to populate the interest rate field based on the credit score obtained from the credit scoring system, the collateral value provided by the asset valuation system, and the interest rate data obtained from the rate information system.

8. The loan rate analysis system of claim 5 further comprising an asset valuation system operative to provide an estimated value of a subject property; and wherein the server is operative to prompt the user for information identifying the subject property and transmit the information to the asset valuation system;

wherein the interest rate calculator interface further comprises a collateral field including a collateral value indicating the value of an asset associated with a loan type;

a collateral field interface control allowing a user to change the collateral value in the collateral field;

wherein the server is operative to populate the collateral field with a collateral value provided, by the asset valuation system, and wherein the server is operative to populate the interest rate field based on the credit score obtained from the credit scoring system, the collateral value provided by the asset valuation system, the capacity value computed by the server and the interest rate data obtained from the rate information system.

9. The loan rate analysis system of claim 1 wherein the calculator interface includes a local interest rate database, wherein the server is operative to populate the local interest rate database based on the credit score associated with the user, and wherein the calculator interface accesses the local interest rate database for interest rate values in response to manipulation of the interface controls.

10. An interest rate calculator interface comprising a credit score field including a credit score value;

a credit score field interface control allowing a user to change the credit score value in the credit score field;

an interest rate field displaying at least one loan type and a corresponding interest rate based at least in part on the current credit score value in the credit score field, and a local interest rate database storing interest rate information for at least one loan type, wherein the interest rate calculator interface is operative, in response to manipulation of the credit score interface control, to change the displayed interest rate for the at least one loan type based on the interest rate information stored in the local interest rate database.

11. The interest rate calculator interface of claim 10 wherein the interface is operative to download interest rate information from a remote server in response to manipulation of the credit score interface control.

12. The interest rate calculator interface of claim 10 wherein the interface is executed within the context of a browser resident on a client computer.

13. The interest rate calculator interface of claim 10 wherein the credit score field interface control comprises a slider interface control.

14. The interest rate calculator interface of claim 10 further comprising
a capacity field including a capacity value corresponding to the debt-to-income ratio associated with the user;
a capacity field interface control allowing the user to change the capacity value in the capacity field;
and wherein the interest rate displayed in the interest rate field of the calculator interface is responsive to manipulation of the capacity field interface control and/or the credit score interface control.

15. The interest rate calculator interface of claim 14 further comprising
a collateral field including a collateral value indicating the value of an asset associated with a loan type;
a collateral field interface control allowing the user to change the collateral value in the collateral field;
and wherein the interest rate displayed in the interest rate field of the calculator interface is responsive to manipulation of the collateral field interface control, capacity field interface control and/or the credit score interface control.

16. A loan rate analysis system, comprising
a rate information database storing interest rate information for at least one loan type, and operative to return the interest rate(s) corresponding to a given credit score for at least one desired loan type; and
a server operative to:
obtain, from a user, information allowing for the retrieval of credit report data,
interact with a credit data repository to obtain a credit history data associated with the user,
transmit at least a portion of the credit history data to a credit scoring system to receive a credit score in return,
transmit to the user an executable code object operative to present an interest rate calculator interface comprising a credit score field including a credit score value; a credit score field interface control allowing a user to change the credit score value in the credit score field; and an interest rate field displaying at least one loan type and a corresponding interest rate based at least in part on the current credit score value in the credit score field, wherein the interest rate displayed in the interest rate field of the calculator interface is responsive to manipulation of the credit score interface control; wherein the credit score field is initially populated with the credit score obtained from the credit scoring system and the interest rate field is initially populated from the interest rate data obtained from the rate information database.

17. The system of claim 16 wherein the server is further operative to determine an interest rate for the loan type based on the interest rate information and the credit score associated with the user.

18. The loan rate analysis system of claim 16 wherein the executable code object is executable within the context of a browser resident on a client computer.

19. The loan rate analysis system of claim 16 wherein the executable code object is a Java applet operating within the context of a browser.

20. The loan rate analysis system of claim 16 wherein the interest rate calculator interface further comprises
a capacity field including a capacity value corresponding to the debt-to-income ratio associated with the user in relation to a contemplated loan;
a capacity field interface control allowing a user to change the capacity value in the capacity field;
wherein the server is operative co populate the capacity field with a capacity value based on factor information provided by the user and/or obtained from the credit report data associated with the user, and wherein the server is operative to populate the interest rate field based on the credit score obtained from the credit scoring system, the capacity value computed by the server, and the interest rate data obtained from the rate information database,
and wherein the interest rate displayed in the interest rate field of the calculator interface is responsive to manipulation of the capacity field interface control and/or the credit score interface control.

21. The loan rate analysis system of claim 16 wherein the interest rate calculator interface further comprises
a collateral field including a collateral value indicating the value of an asset associated with a loan type;
a collateral field interface control allowing a user to change the collateral value in the collateral field;
wherein the server is operative to populate the collateral field with a collateral value provided by the user, and wherein the server is operative to populate the interest rate field based on the credit score obtained from the credit scoring system, the collateral value provided by the user, and the interest rate data obtained from the rate information database.

22. The loan rate analysis system of claim 16 wherein the executable code object includes a local interest rate database, wherein the server is operative to populate the local interest rate database based on the credit score associated with the user, and wherein the executable code object accesses the local interest rate database for interest rate values in response to manipulation of the interface controls.

* * * * *